United States Patent
Toya et al.

(10) Patent No.: US 10,432,480 B2
(45) Date of Patent: Oct. 1, 2019

(54) STORAGE BATTERY MANAGEMENT METHOD AND STORAGE BATTERY MANAGEMENT SYSTEM

(71) Applicant: Panasonic Intellectual Property Management Co., Ltd., Osaka (JP)

(72) Inventors: Shoichi Toya, Hyogo (JP); Yoshito Nakanishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 798 days.

(21) Appl. No.: 14/829,816

(22) Filed: Aug. 19, 2015

(65) Prior Publication Data

US 2015/0358214 A1    Dec. 10, 2015

Related U.S. Application Data

(63) Continuation of application No. PCT/JP2015/000275, filed on Jan. 22, 2015.

(30) Foreign Application Priority Data

Jan. 31, 2014   (JP) .................. 2014-017573

(51) Int. Cl.
*H04L 12/24*   (2006.01)
*H02J 7/00*    (2006.01)
(Continued)

(52) U.S. Cl.
CPC ............ *H04L 41/50* (2013.01); *H02J 7/0021* (2013.01); *H02J 13/0013* (2013.01); *H01M 2010/4278* (2013.01); *H02J 2007/0096* (2013.01)

(58) Field of Classification Search
CPC ............ Y02T 10/7055; Y02T 10/7005; Y02T 10/705; Y02T 10/7044; Y02T 10/7061;
(Continued)

(56) References Cited

U.S. PATENT DOCUMENTS

2005/0071699 A1* 3/2005 Hammond ............... G06F 1/30
                                                713/300
2011/0057612 A1  3/2011 Taguchi et al.
(Continued)

FOREIGN PATENT DOCUMENTS

| JP | 2011-055689 | 3/2011 |
| JP | 2012-147580 | 8/2012 |
| JP | 2012-155981 | 8/2012 |

OTHER PUBLICATIONS

International Search Report of PCT application No. PCT/JP2015/000275 dated Mar. 17, 2015.

*Primary Examiner* — Tauqir Hussain
(74) *Attorney, Agent, or Firm* — Greenblum & Bernstein, P.L.C.

(57) ABSTRACT

A storage battery management method which is performed in a communication terminal, the storage battery management method including: performing communication with a storage battery which is an object to be managed and acquiring storage battery information on the use of the storage battery; storing the acquired storage battery information every time the storage battery information is acquired; and performing communication with a management server managing the storage battery and providing, only when accepting a request for provision of the storage battery information from the management server, storage battery information of the stored storage battery information, the storage battery information in accordance with the request for provision, to the management server.

10 Claims, 10 Drawing Sheets

| STORAGE BATTERY ID | ELECTRICITY STORAGE CAPACITY | USE STARTING DATE | LATEST UPDATE DATE AND TIME | PREDICTED LIFE |
|---|---|---|---|---|
| x001 | 5 kwh | 01/01/2013/00:00 | 01/06/2014/14:00 | O |

| UPDATE DATE AND TIME | CHARGING DATE AND TIME | AMOUNT OF CHARGE | DISCHARGING DATE AND TIME | AMOUNT OF DISCHARGE |
|---|---|---|---|---|
| 01/10/2013/18:00 | 01/01/2013 00:00 - 05:00 | 95% | 01/05/2013 12:00 - 13:00 | 5% |
|  | ⋮ | ⋮ | ⋮ | ⋮ |
| 02/07/2013/18:00 | 01/11/2013 03:00 - 06:00 | 60% | 01/01/2013 17:30 - 19:00 | 10% |

(51) Int. Cl.
*H02J 13/00* (2006.01)
*H01M 10/42* (2006.01)

(58) Field of Classification Search
CPC ...... G06Q 10/087; G06Q 10/08; G06Q 50/06; G06Q 30/0235
USPC .......................................................... 709/223
See application file for complete search history.

(56) References Cited

U.S. PATENT DOCUMENTS

| | | | | |
|---|---|---|---|---|
| 2012/0191578 A1* | 7/2012 | Katagishi | ............ | G06Q 10/087 705/28 |
| 2012/0212183 A1* | 8/2012 | Yamada | .................... | H02J 3/32 320/126 |
| 2013/0289821 A1 | 10/2013 | Nakagawa | | |
| 2014/0089692 A1* | 3/2014 | Hanafusa | .............. | H01M 10/48 713/310 |
| 2014/0320080 A1* | 10/2014 | Nyu | ...................... | B60L 11/184 320/109 |
| 2016/0124050 A1* | 5/2016 | Hua | .......................... | B60L 3/00 320/109 |

* cited by examiner

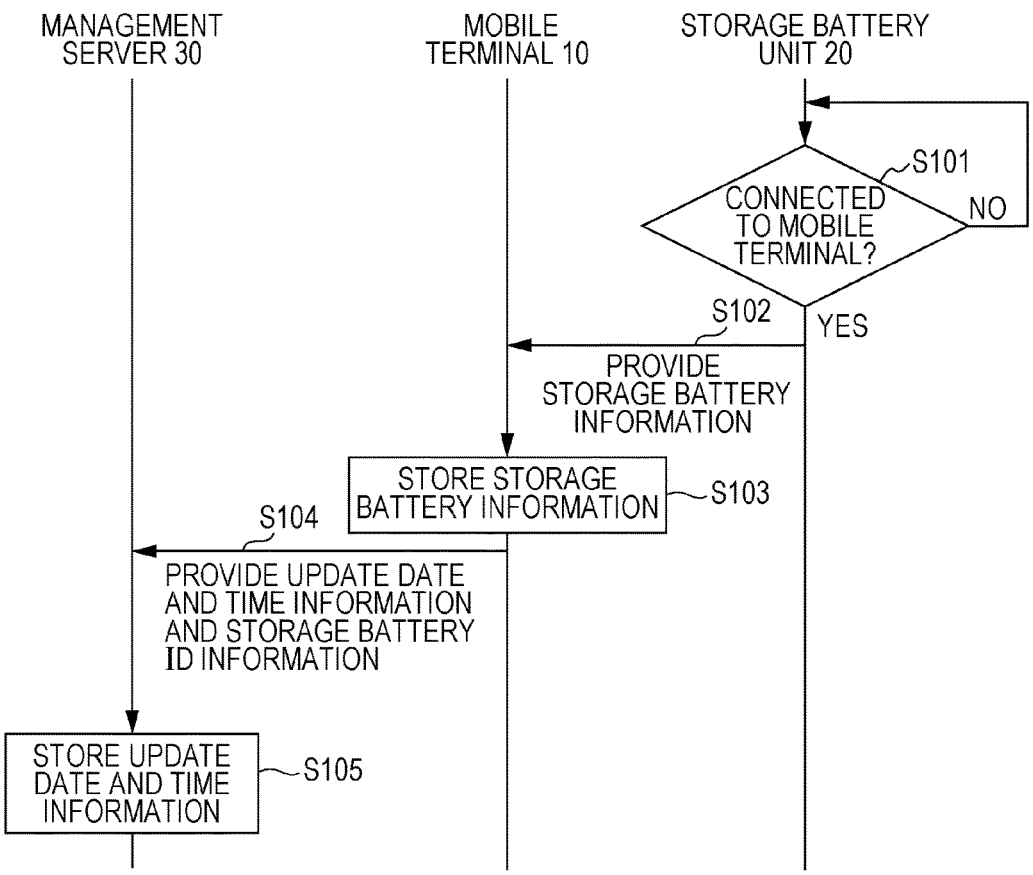

FIG. 9A

| STORAGE BATTERY CATEGORY | STORAGE BATTERY ID |
|---|---|
| x | x001, x002, ⋯ |
| y | y001, y002, ⋯ |
| ⋮ | ⋮ |

FIG. 9B

| INQUIRY USER CATEGORY | STORAGE BATTERY CATEGORY FOR WHICH INQUIRY IS ACCEPTED | INQUIRY USER ID |
|---|---|---|
| 1 | ALL | 001p, 002p, ⋯ |
| 2 | x | 001q, 002q, ⋯ |
| 3 | y, z | 001r, 002r, ⋯ |
| ⋮ | ⋮ | ⋮ |

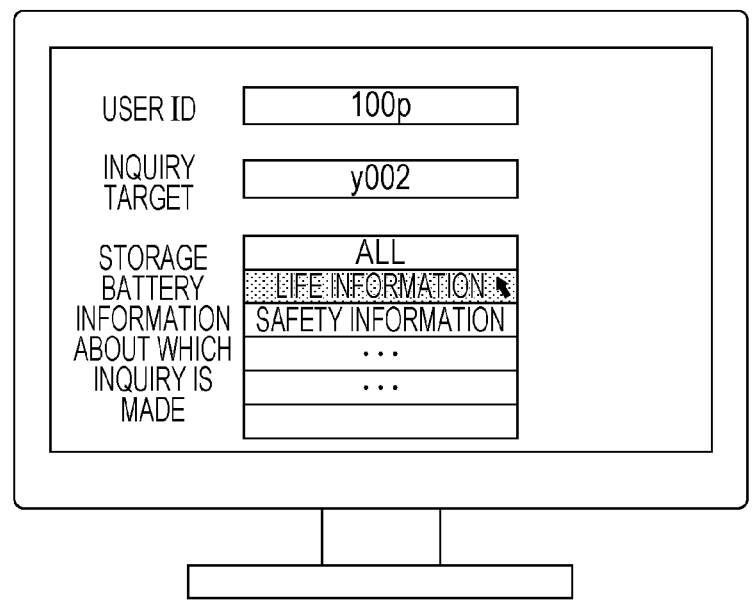

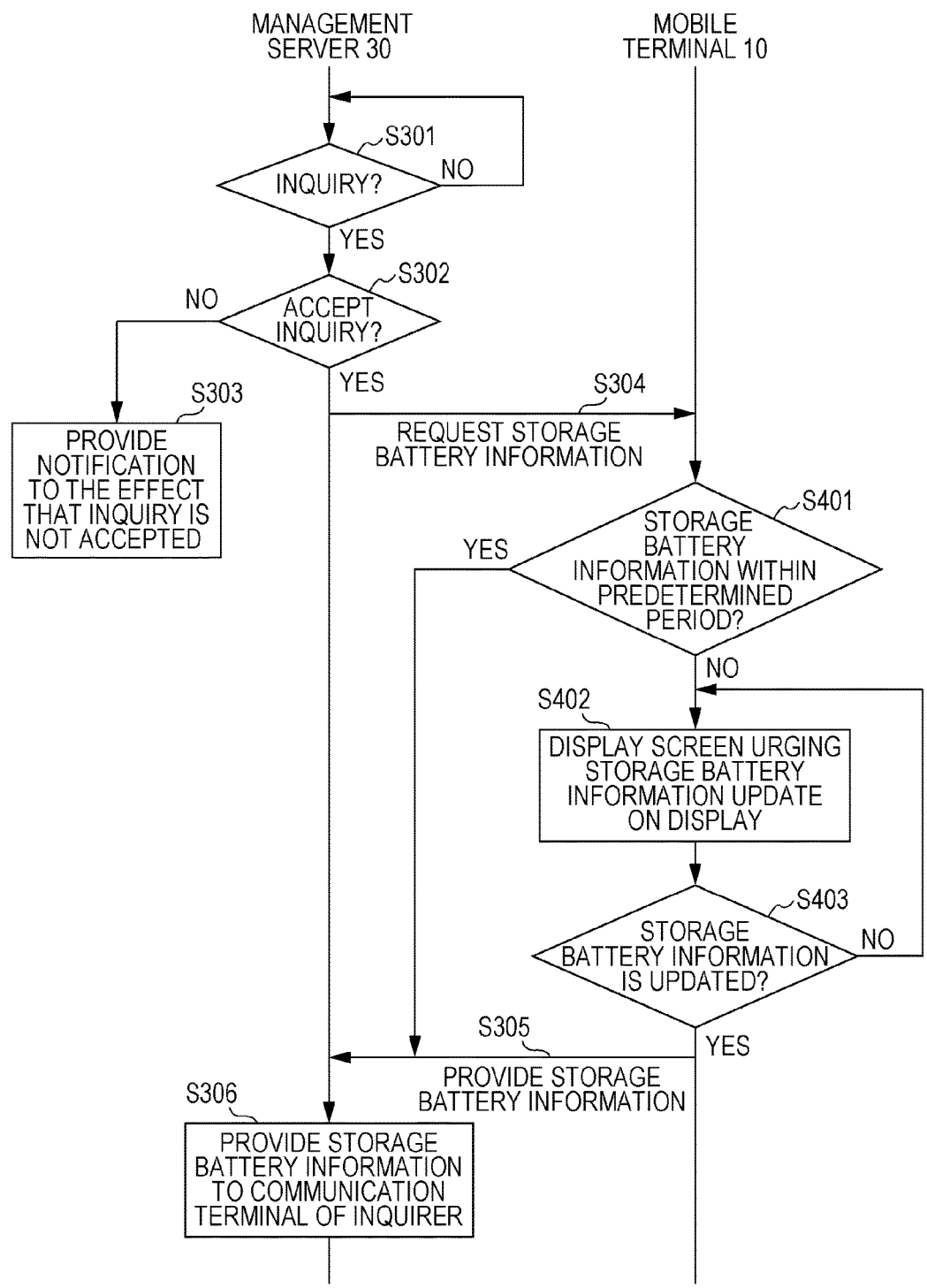

STORAGE BATTERY MANAGEMENT METHOD AND STORAGE BATTERY MANAGEMENT SYSTEM

BACKGROUND

1. Technical Field

The present disclosure relates to a communication terminal managing a storage battery, a storage battery management method, a storage battery management system and a medium storing a storage battery management program.

2. Description of the Related Art

In recent years, storage batteries have been used in various fields. With the popularization of the storage batteries, the needs for the provision of service to the user by grasping information on the use of a storage battery have grown.

For example, in Japanese Unexamined Patent Application Publication No. 2012-147580, a technique of uploading information indicating the state of charge of a storage battery mounted on a vehicle to a management server with prescribed timing is disclosed.

SUMMARY

However, with the technique disclosed in Japanese Unexamined Patent Application Publication No. 2012-147580, as the number of storage batteries which are managed is increased, the amount of information which is gathered in the management server is increased and the amount of data which is stored in the management server or the communication load on the management server is undesirably increased.

One non-limiting and exemplary embodiment provides a communication terminal that reduces the burden on a management server.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

In one general aspect, the techniques disclosed here feature a storage battery management method which is performed in a communication terminal including: performing communication with a storage battery which is an object to be managed and acquiring storage battery information on a use of the storage battery; storing the acquired storage battery information every time the storage battery information is acquired; and performing communication with a management server managing the storage battery and providing, only when accepting a request for provision of the storage battery information from the management server, storage battery information of the stored storage battery information, the storage battery information in accordance with the request for provision, to the management server.

The communication terminal stores the acquired storage battery information every time the communication terminal acquires the storage battery information from the storage battery. Then, only when the management server makes a request for provision of the storage battery information, the communication terminal provides the storage battery information in accordance with the request for provision to the management server. As a result, the management server can acquire desired storage battery information from a mobile terminal if there is desired storage battery information without storing the storage battery information at all times, which makes it possible to reduce the communication load between the communication terminals in the management server.

It should be noted that general or specific embodiments may be implemented as a system, a method, an integrated circuit, a computer program, a storage medium, or any selective combination thereof.

BRIEF DESCRIPTION OF THE DRAWINGS

FIG. 4 depicts an example of information which is stored in a server database of the management server;

FIG. 5 is a sequence diagram depicting an operation concerning storage battery information acquisition, the operation of the whole of the storage battery management system;

FIGS. 9A and 9B depict an example of an inquiry authentication condition;

FIG. 10A is a diagram explaining an inquiry in accordance with the contents of storage battery information in a modified example (I) and FIG. 10B depicts an example of an inquiry authentication condition corresponding to FIG. 10A; and FIG. 11 is a sequence diagram depicting an operation concerning an inquiry about storage battery information, the operation of the mobile terminal and the management server, in a modified example (II).

DETAILED DESCRIPTION

<<Embodiment>>

Hereinafter, an aspect of an embodiment of the present disclosure will be described with reference to the drawings.

A mobile terminal according to this embodiment performs communication with a storage battery unit and acquires and stores information (hereinafter referred to as storage battery information) on the use of a storage battery, the information held in the storage battery unit. Then, the mobile terminal performs communication with a management server and uploads, to the management server, date and time information on a date and a time on and at which the storage battery information was acquired. The management server manages the date and time information and, if the storage battery information has not been updated in the mobile terminal for a long period of time, requests the mobile terminal to update the storage battery information.

Moreover, when storage battery information is requested from the management server, the mobile terminal according to this embodiment provides the requested information to the management server. This makes it possible for the management server to acquire the storage battery information from the mobile terminal with necessary timing without holding the storage battery information.

<1. Configuration>

Figure 1:
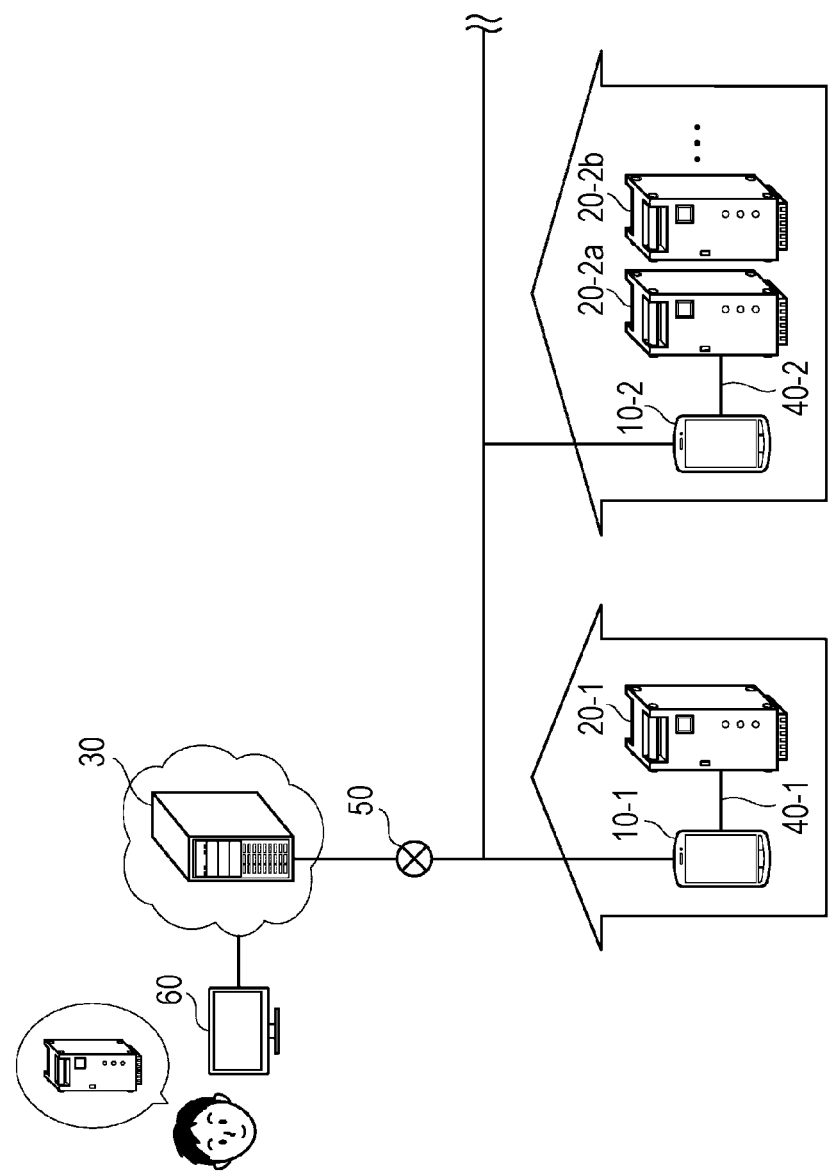
FIG. 1 is a schematic diagram of a storage battery management system.

FIG. 1 is a diagram depicting the outline of a storage battery management system 1 including the mobile terminal according to this embodiment.

In the storage battery management system 1 depicted in FIG. 1, mobile terminals 10-1 and 10-2 according to this embodiment perform communication with a storage battery unit 20-1 and storage battery units 20-2a and 20-2b, respectively, the storage battery units 20-1, 20-2a, and 20-2b being objects to be managed, via connecting cables 40-1 and 40-2, respectively, and acquire and store storage battery information held in the storage battery units 20-1, 20-2a, and 20-2b. Moreover, the mobile terminals 10-1 and 10-2 each perform communication with a management server 30 via a public line network 50 and manage the storage battery information of the corresponding storage battery unit in cooperation with the management server 30. As described above, the mobile terminal according to this embodiment manages the storage battery information of one or more storage battery units.

The management server 30 receives an inquiry about storage battery information from a communication terminal 60, and acquires storage battery information in accordance with the inquiry from a mobile terminal holding the information and provides the information to the communication terminal 60.

Figure 2:
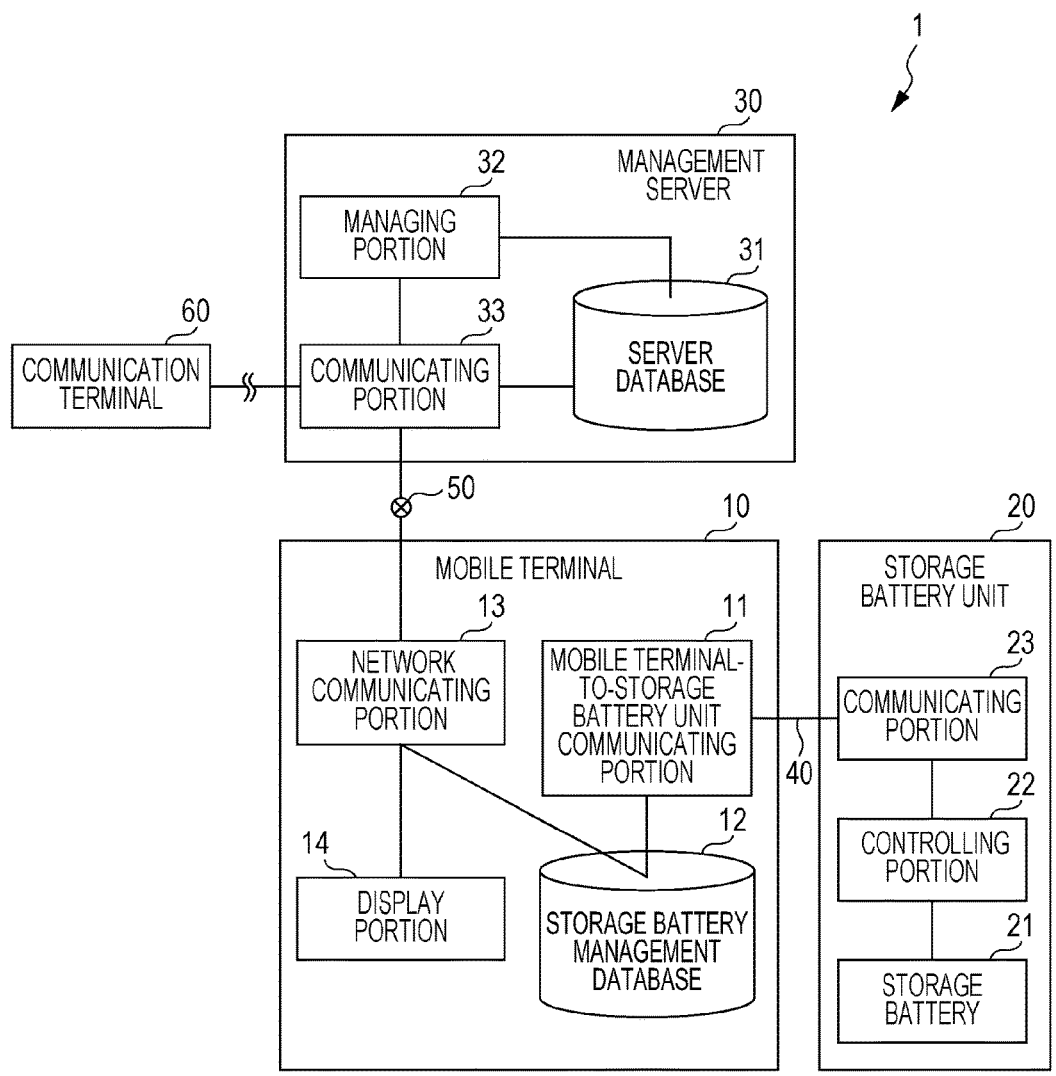
FIG. 2 is a block diagram depicting the configurations of a mobile terminal, a storage battery unit, and a management server.

FIG. 2 is a block diagram depicting the configurations of a mobile terminal 10, a storage battery unit 20, and the management server 30. In FIG. 2, the mobile terminal 10 corresponds to the mobile terminals 10-1 and 10-2 depicted in FIG. 1, the storage battery unit 20 corresponds to the storage battery units 20-1, 20-2a, and 20-2b depicted in FIG. 1, and a connecting cable 40 corresponds to the connecting cables 40-1 and 40-2 depicted in FIG. 1.

<1-1. Configuration of the Storage Battery Unit 20>

The storage battery unit 20 includes a storage battery 21, a controlling portion 22, and a communicating portion 23.

The controlling portion 22 has the function of controlling charge and discharge of the storage battery 21 and holding the storage battery information. The storage battery information is, for example, charge and discharge historical information of the storage battery 21 such as a charging time, the number of times the storage battery 21 is charged, a discharging time, or the number of times the storage battery 21 is discharged or information on a load on which discharge is to be performed.

The communicating portion 23 has the function of performing communication with a mobile terminal-to-storage battery unit communicating portion 11, which will be described later, of the mobile terminal 10 via the connecting cable 40 and providing the storage battery information held in the controlling portion 22 to the mobile terminal 10.

<1-2. Configuration of the Mobile Terminal 10>

The mobile terminal 10 includes the mobile terminal-to-storage battery unit communicating portion 11, a storage battery management database 12, a network communicating portion 13, and a display 14.

The mobile terminal-to-storage battery unit communicating portion 11 has the function of performing communication with the communicating portion 23 of the storage battery unit 20 via the connecting cable 40. In addition, the mobile terminal-to-storage battery unit communicating portion 11 has the function of being provided with the storage battery information from the communicating portion 23 and outputting the storage battery information to the storage battery management database 12. The mobile terminal-to-storage battery unit communicating portion 11 corresponds to a first communicator of the present disclosure.

The storage battery management database 12 has the function of storing the storage battery information output from the mobile terminal-to-storage battery unit communicating portion 11 and storing update date and time information indicating a date and a time (the update date and time of the storage battery information) on and at which the storage battery information was stored.

Incidentally, the mobile terminal 10 may store the storage battery information acquired in the mobile terminal-to-storage battery unit communicating portion 11 in the storage battery management database 12 as it is or store the acquired storage battery information in the storage battery management database 12 after processing the acquired storage battery information into a predicted life, an accumulated charging time, or the like by an application, for example.

Figure 3:
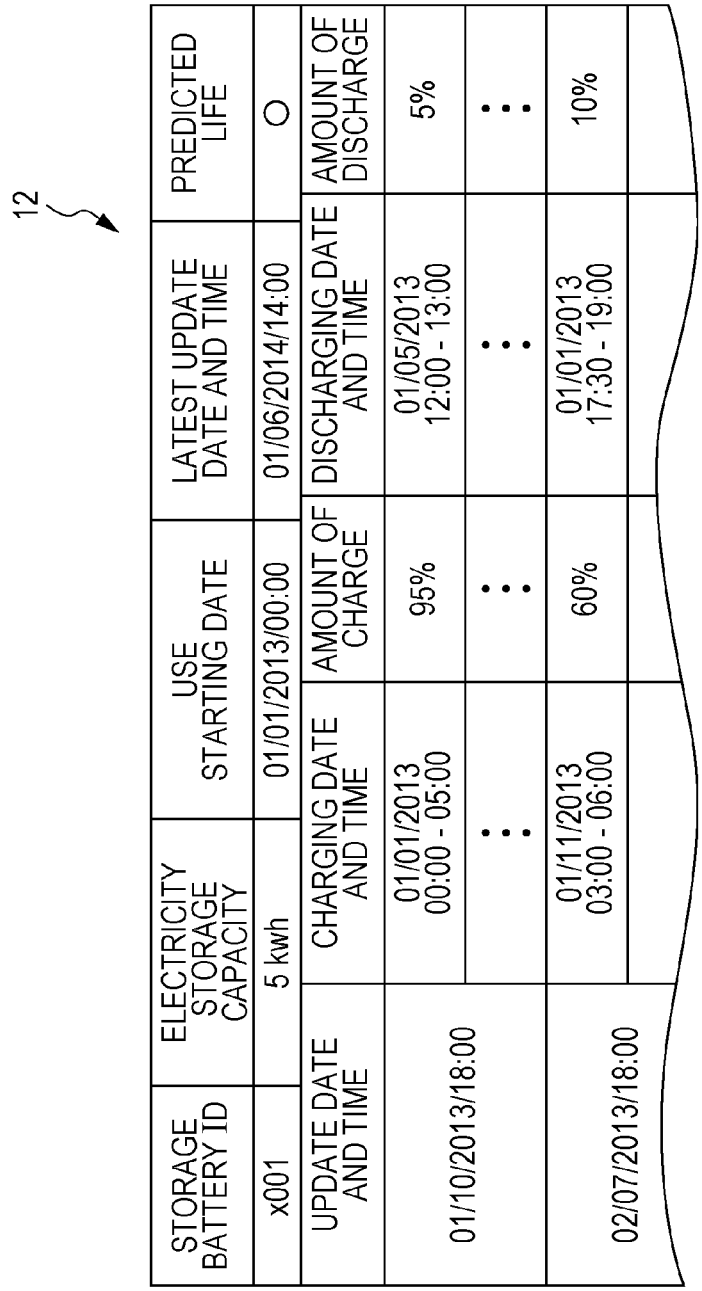
FIG. 3 depicts an example of information which is stored in a storage battery management database of the mobile terminal.

FIG. 3 depicts an example of information which is stored in the storage battery management database 12. In the storage battery management database 12 depicted in FIG. 3, for each update date and time of the storage battery information, as the storage battery information, date and time information on a date and a time ("charging date and time") on and at which the storage battery was charged, the ratio of the amount of charge to the storage battery capacity ("amount of charge"), date and time information on a date and a time ("discharging date and time") on and at which the storage battery was discharged, and the ratio of the amount of discharge to the storage battery capacity ("amount of discharge") are stored. Moreover, in FIG. 3, predicted life status information is stored and schematically indicates the status of a predicted life by using a circle. The predicted life of the storage battery can be estimated based on the charge and discharge historical information, for example.

Back in FIG. 2, the explanation will be continued.

The network communicating portion 13 has the function of performing communication with a communicating portion 33 of the management server 30 via the public line network 50. In addition, the network communicating portion 13 has the function of providing the update date and time information and the ID information of the storage battery to the management server 30 every time the storage battery information is updated in the storage battery management database 12. Moreover, the network communicating portion 13 has the function of providing the storage battery information to the management server 30 and outputting an instruction from the management server 30 to the display 14. The details will be described in <2. Operation> which will be described later. The network communicating portion 13 corresponds to a second communicator of the present disclosure.

The display 14 has the function of receiving an instruction from the management server 30, the instruction output from the network communicating portion 13, and performing, on a display (not depicted in the drawing) provided in the mobile terminal 10, a screen display urging update of the storage battery information.

<1-3. Configuration of the Management Server 30>

The management server 30 includes a server database 31, a managing portion 32, and the communicating portion 33.

The server database 31 has the function of storing the update date and time information of the storage battery information, the update date and time information provided from the mobile terminal 10 via the communicating portion 33, in a state in which the update date and time information is related to the ID information of the storage battery.

FIG. 4 depicts an example of information which is stored in the server database 31. In the server database 31 depicted in FIG. 4, ID information ("mobile terminal ID") of a mobile terminal which is connected to the management server 30 and ID information ("storage battery ID") of a storage battery corresponding to each mobile terminal are stored in a state in which the mobile terminal ID and the storage battery ID are related to each other, and information ("latest update date and time") indicating the last date and time on and at which the storage battery information was acquired in each mobile terminal is stored.

Back in FIG. 2, the explanation will be continued.

The communicating portion 33 has the function of performing communication with the network communicating portion 13 of the mobile terminal 10 via the public line network 50 and performing communication with the communication terminal 60 of an inquirer who requests the provision of the storage battery information. The details will be described in <2. Operation> which will be described later.

The managing portion 32 has the function of managing the update state of the storage battery information in the mobile terminal 10 by monitoring the server database 31 and performing authentication of an inquiry about the storage battery information. The details will be described in <2. Operation> which will be described below.

<2. Operation>

FIG. 5 is a sequence diagram depicting an operation concerning storage battery information acquisition, the operation of the whole of the storage battery management system 1.

If the mobile terminal 10 and the storage battery unit 20 are connected by the connecting cable 40 (step S101: YES), the communicating portion 23 of the storage battery unit 20 provides the storage battery information held in the controlling portion 22 to the mobile terminal-to-storage battery unit communicating portion 11 of the mobile terminal 10 (step S102). The mobile terminal-to-storage battery unit communicating portion 11 of the mobile terminal 10 outputs the storage battery information thus provided to the storage battery management database 12. The storage battery management database 12 stores the output storage battery information and the update date and time information of the storage battery information (step S103). If the storage battery information is updated in the storage battery management database 12, the network communicating portion 13 provides the update date and time information of the storage battery information and the ID information of the storage battery to the management server 30 (step S104). The communicating portion 33 of the management server 30 accepts the provision of these information and outputs the information to the server database 31. The server database 31 stores the update date and time information output from the communicating portion 33 in a state in which the update date and time information is related to the storage battery ID and the mobile terminal ID (step S105).

As described above, every time the storage battery information is updated, as a result of the mobile terminal 10 providing the update date and time information of the storage battery information and the ID information of the storage battery to the management server 30, the management server 30 can manage the update state of the storage battery information in the mobile terminal 10.

Figure 6:
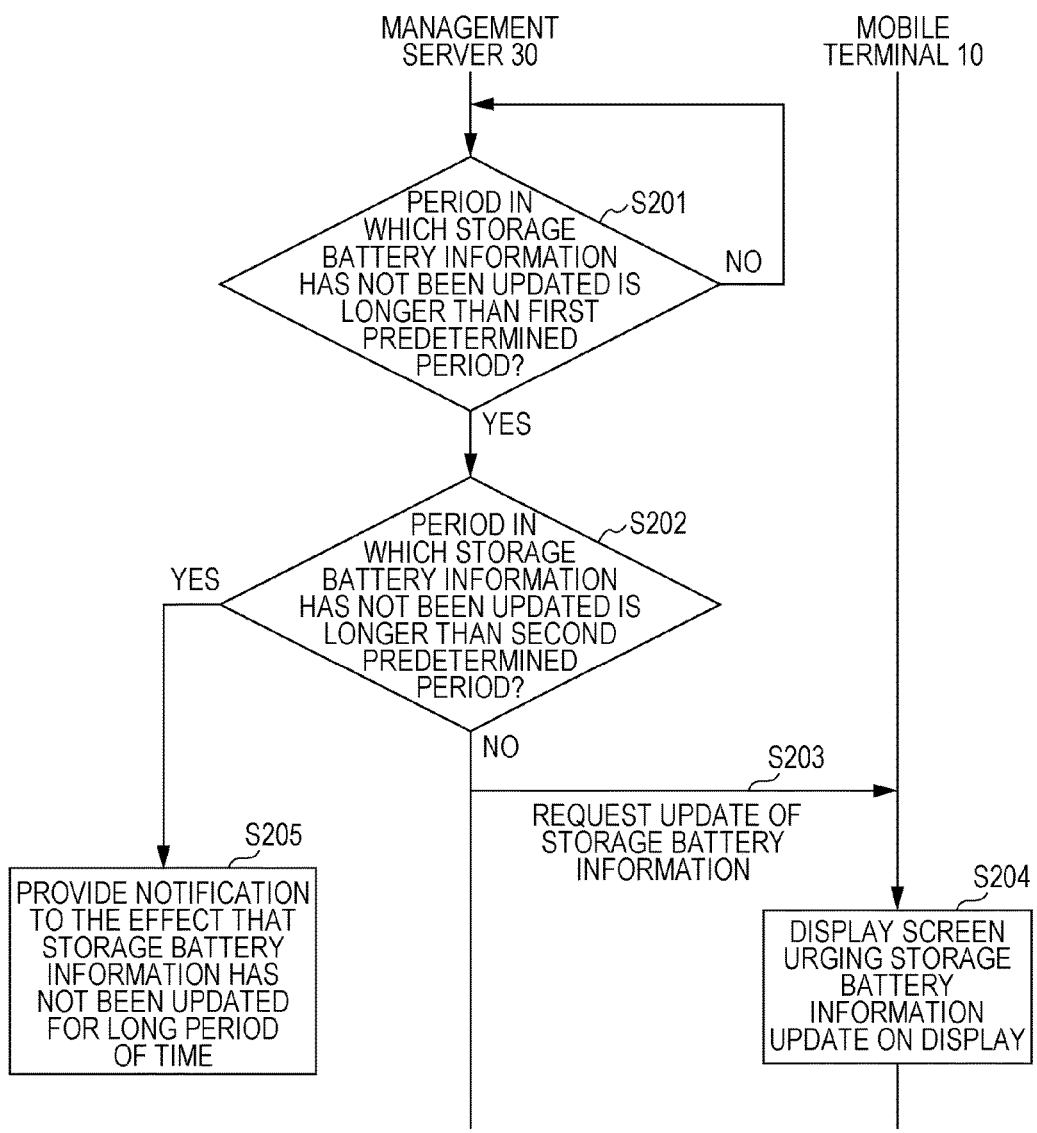
FIG. 6 is a sequence diagram depicting an operation concerning the management of the update state of storage battery information, the operation in the mobile terminal and the management server.

FIG. 6 is a sequence diagram indicating an operation concerning the management of the update state of the storage battery information, the operation in the mobile terminal 10 and the management server 30.

The managing portion 32 of the management server 30 regularly performs monitoring to determine whether or not a period in which the storage battery information has not been updated is longer than a first predetermined period for each of the storage batteries (mobile terminals) which are objects to be managed by referring to the server database 31 (step S201). If the period is not longer than the first predetermined period (step S201: NO), the processing in step S201 is repeatedly performed.

On the other hand, if the period in which the storage battery information has not been updated is longer than the first predetermined period (step S201: YES) and is not longer than a second predetermined period (step S202: NO), the managing portion 32 gives an instruction to the communicating portion 33 to notify the mobile terminal 10 corresponding to the storage battery of an instruction to request update of the storage battery information. Then, the communicating portion 33 notifies the mobile terminal 10 of the instruction to request update of the storage battery information and the ID information of the storage battery whose update is requested (step S203). The network communicating portion 13 of the mobile terminal 10 receives the notification from the communicating portion 33 of the management server 30 and makes the display 14 perform a screen display urging update of the storage battery information (step S204). As a result of this screen display, if the mobile terminal 10 and the storage battery unit 20 are connected by the connecting cable 40 (FIG. 5: step S101: YES), the mobile terminal 10, the storage battery unit 20, and the management server 30 perform the operation concerning the storage battery information acquisition which has been described in FIG. 5.

Figure 7:
FIG. 7 depicts an example of a screen display by a display of the mobile terminal.

FIG. 7 depicts an example of the screen display urging update of the storage battery information, the screen display performed by the display 14. If the storage battery information has not been updated for a long period of time, it causes a problem in the management of the storage battery by the management server 30. By making the display of the mobile terminal 10 perform a screen display urging update of the storage battery information, the management server 30 can prevent a situation in which the storage battery information has not been updated for a long period of time.

Back in FIG. 6, the explanation will be continued.

Moreover, if the period in which the storage battery information has not been updated is longer than the first predetermined period (step S201: YES) and is longer than the second predetermined period (step S202: YES), the managing portion 32 of the management server 30 notifies a provider of the storage battery management system 1 of the situation in which the storage battery information has not been updated in the mobile terminal 10 for a long period of time (step S205). This notification makes it possible for the provider of the storage battery management system 1 to deal with the situation in which the storage battery information has not been updated for a long period of time.

Figure 8:
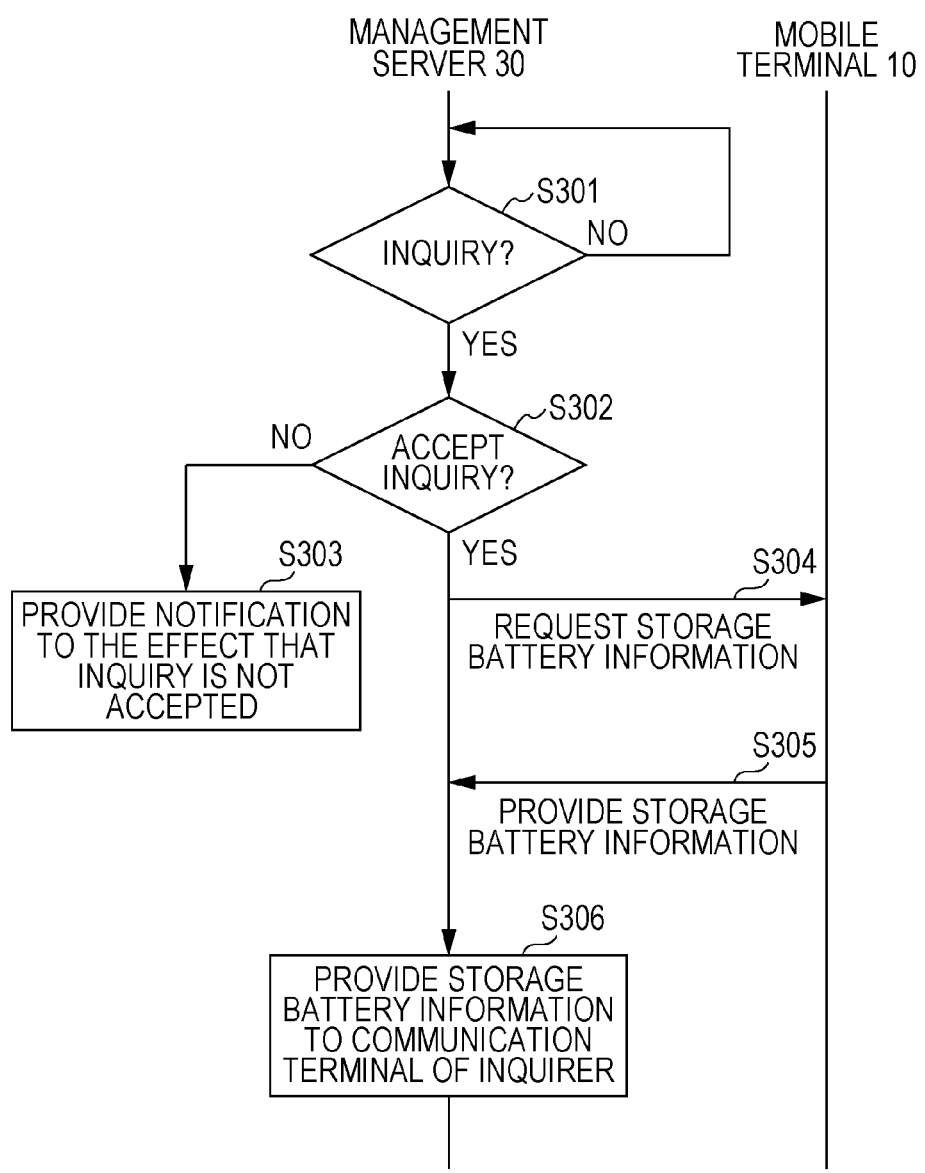
FIG. 8 is a sequence diagram depicting an operation concerning an inquiry about storage battery information in the mobile terminal and the management server.

FIG. 8 is a sequence diagram depicting an operation concerning an inquiry about the storage battery information in the mobile terminal 10 and the management server 30.

For example, a user who makes an inquiry about the storage battery information (hereinafter referred to as an inquiry user) notifies the management server 30 of inquiry user identification ID information and inquiry target storage battery ID information from the communication terminal 60.

If the communicating portion 33 of the management server 30 is notified of the inquiry user identification ID information and the inquiry target storage battery ID information from the communication terminal 60, the communicating portion 33 outputs the information thus notified to the managing portion 32 (step S301: YES). The managing portion 32 performs authentication as to whether or not to accept the inquiry based on the inquiry user identification ID information and the inquiry target storage battery ID information which were output from the communicating portion 33 and a previously set inquiry authentication condition (step S302). If the inquiry is not accepted (step S302: NO), the managing portion 32 notifies the communication terminal 60 of the inquiry user that the inquiry is not accepted (step S303).

On the other hand, if the inquiry is accepted (step S302: YES), the managing portion 32 gives an instruction to the communicating portion 33 to notify the mobile terminal 10 corresponding to the inquiry target storage battery of an instruction to request the provision of the storage battery information. Then, the communicating portion 33 notifies the mobile terminal 10 of the instruction to request the provision of the storage battery information and the ID information of the inquiry target storage battery (step S304). The network communicating portion 13 of the mobile terminal 10 receives the notification from the communicating portion 33 of the management server 30 and provides the storage battery information stored in the storage battery management database 12 to the management server 30 (step S305). When being provided with the storage battery information from the mobile terminal 10, the communicating portion 33 of the management server 30 provides the storage battery information thus provided to the communication terminal 60 of the inquiry user (step S306).

Here, an inquiry authentication method in the managing portion 32 will be described.

FIGS. 9A and 9B are diagrams depicting an example of an inquiry authentication condition. As depicted in FIG. 9A, for example, storage batteries are classified into storage battery categories, and, as depicted in FIG. 9B, a storage battery (a storage battery category) for which an inquiry is accepted is set for each inquiry user category. In addition, the managing portion 32 may be made to store such an authentication condition in advance such that, if the inquiry user identification ID information and the inquiry target storage battery ID information which were output from the communicating portion 33 meet the authentication condition, the inquiry is accepted; if the inquiry user identification ID information and the inquiry target storage battery ID information do not meet the authentication condition, the inquiry is not accepted.

Incidentally, the storage battery categories simply have to be set in accordance with the needs of the inquiry user and may be classified based on, for example, the capacity and type of the storage battery, a load which is used, or the like.

As described above, as a result of the management server 30 performing authentication of a storage battery information inquiry, it becomes possible to limit access to the storage battery information. Moreover, as described in FIG. 6, the management server 30 performs management in such a way as to prevent a situation in which the storage battery information has not been updated in the mobile terminal 10 for a long period of time. Therefore, if an inquiry about storage battery information is made to the management server 30, the management server 30 can immediately acquire the latest storage battery information from the mobile terminal 10 and provide the storage battery information to the inquirer.

The mobile terminal 10 according to this embodiment acquires and holds storage battery information and, every time the storage battery information is updated, provides the update date and time information of the storage battery information to the management server 30. This allows the management server 30 to manage the update state of the storage battery information in the mobile terminal 10 and acquire the storage battery information from the mobile terminal 10 with necessary timing. With the mobile terminal 10 according to this embodiment, it is possible to manage the storage battery information in cooperation with the management server 30 and reduce the amount of data which is stored in the management server 30 or a communication load in the management server 30.

<3. Modified Example (I)>

In the storage battery management system 1 of the embodiment described above, the management server 30 may receive an inquiry in accordance with the type of storage battery information. Furthermore, the management server 30 may perform authentication of an inquiry in accordance with the type of storage battery information.

Hereinafter, specific descriptions will be given by using FIGS. 10A and 10B.

For example, as depicted in FIG. 10A, in addition to the inquiry user identification ID information ("100p") and the inquiry target storage battery ID information ("y002"), an inquirer further inputs the type ("life") of storage battery information about which an inquiry is made to the communication terminal 60. The communication terminal 60 notifies the management server 30 of these input information (FIG. 8: step S301).

The management server 30 performs authentication of the inquiry made by the inquiry user based on the input information and the authentication condition depicted in FIG. 10B, for example (step S302). In FIG. 10B, since an inquiry about the storage battery information (type: "life") of the storage battery (storage battery ID: "y002") made by the inquiry user (user ID: "001p") is accepted (step S302: YES), the management server 30 requests the storage battery information on the life of the inquiry target storage battery from the mobile terminal 10 corresponding to the inquiry target storage battery (step S304). Then, the mobile terminal 10 provides the requested information to the management server 30 (step S305), and the management server 30 provides the information provided from the mobile terminal 10 to the communication terminal 60 (step S306).

In this modified example, the inquiry user can select desired storage battery information and make an inquiry. Moreover, the management server 30 can make the fine settings and perform management as to whether or not to accept an inquiry in accordance with the type of storage battery information.

Incidentally, in the embodiment described above and this modified example, an example in which storage battery information is acquired for each inquiry target storage battery has been described, but a configuration may be adopted in which an inquiry user can collectively acquire storage battery information of storage batteries under a storage battery category. In that case, as an authentication condition, for example, a storage battery category for which an inquiry is accepted in accordance with an inquiry user may be set in the management server 30.

<4. Modified Example (II)>

In the embodiment described above, the operation concerning an inquiry about storage battery information in the mobile terminal 10 and the management server 30, the operation described in FIG. 8, may be modified as depicted in FIG. 11.

In FIG. 11, in addition to each processing described in FIG. 8, processing in steps S401 to S403 which is performed by the mobile terminal 10 is added.

Specifically, when receiving an instruction to request the provision of storage battery information from the management server 30, the network communicating portion 13 of the mobile terminal 10 refers to the storage battery management database 12 and checks whether or not the storage battery information about which the request instruction was given has been updated within a predetermined period with reference to the time at which the storage battery management database 12 was referred to (step S401). If the storage battery information has been updated within the predetermined period (step S401: YES), as is the case with the embodiment described above, the network communicating portion 13 provides the storage battery information stored in the storage battery management database 12 to the management server 30 (step S305).

On the other hand, if the storage battery information has not been updated within the predetermined period (step S401: NO), the network communicating portion 13 makes the display 14 perform a screen display urging update of the storage battery information (step S402). Then, if update of the storage battery information is performed (step S403: YES), the network communicating portion 13 provides the storage battery information stored in the storage battery management database 12 to the management server 30 (step S305). The processing in step S402 is repeatedly performed until the storage battery information is updated (step S402: NO).

This modified example makes it possible for the mobile terminal 10 and the management server 30 to provide the latest storage battery information to the inquiry user.

<5. Modified Example (III)>

The above description deals with a case in which, in the storage battery management system 1 of the embodiment described above, if the storage battery information stored in the mobile terminal 10 has not been updated for a long period of time, the management server 30 notifies the provider of the storage battery management system 1 that the storage battery information stored in the mobile terminal 10 has not been updated for a long period of time (FIG. 5: step S205). If the storage battery has not been updated for a long period of time, the management server 30 cannot acquire the storage battery information during that period and, even when an unusual event that causes trouble to the use of the storage battery occurs, the management server 30 cannot grasp the unusual event. Thus, if the storage battery has not been updated for a long period of time, the management server 30 may determine that the storage battery is under unusual conditions and take measures such as stopping the use of the storage battery or putting a restriction on the secondary use of the storage battery.

Moreover, the above description deals with a case in which, in the storage battery management system 1 of the embodiment described above, if the storage battery information is updated, the mobile terminal 10 provides the update date and time information of the storage battery information to the management server 30 (FIG. 5: step S104). This allows the management server 30 to manage the update of the storage battery information; in addition to that, the management server 30 may be allowed to further perform management as to whether or not an unusual event occurs in the use of the storage battery. To allow the management server 30 to do so, for example, the mobile terminal 10 may acquire, as the storage battery information, the contents of the storage battery information from the storage battery unit 20 if an unusual event occurs in the use of the storage battery and provide the contents of the storage battery information to the management server 30 along with the update date and time information of the storage battery information. Some examples of the unusual event in the use of the storage battery include the storage battery being charged with high voltage or the storage battery being discharged through an undesirable load. Moreover, the mobile terminal 10 may estimate the state of the storage battery based on the storage battery information by using an application, for example, to determine whether or not the storage battery is under unusual conditions and provide the information to the management server 30 along with the update date and time information of the storage battery information.

<6. Supplementary Explanation (I)>

The present disclosure is not limited to the descriptions given in the embodiment described above and the modified examples. The present disclosure can be implemented in any mode for achieving the object of the present disclosure and an object related thereto or associated therewith and may be as follows, for example.

(1) The mobile terminal 10 of the embodiment described above may acquire and hold the storage battery information of a plurality of storage battery units 20.

(2) The storage battery unit 20 of the embodiment described above may be further provided with the function of estimating the life of a storage battery, and information on the life of the storage battery estimated by the storage battery unit 20 may be provided to the mobile terminal 10.

(3) The management server 30 of the embodiment described above may provide information desired by the inquiry user by processing the storage battery information acquired from the mobile terminal 10.

(4) In the storage battery management system 1 of the embodiment described above, the mobile terminal 10 and the storage battery unit 20 perform communication via the connecting cable 40, but the mobile terminal 10 and the storage battery unit 20 may perform communication without wire.

Specifically, for example, a configuration may be adopted in which the pairing setting is made between the mobile terminal 10 and the storage battery unit 20 in advance such that radio connection is automatically established when the mobile terminal 10 and the storage battery unit 20 get closer to each other and the radio connection is automatically disconnected when the mobile terminal 10 and the storage battery unit 20 move away from each other. As a means of radio communication, for example, short-range radio communication such as Bluetooth® or near field communication (NFC) may be used.

Moreover, the storage battery unit 20 may upload the storage battery information to the mobile terminal 10 at regular or irregular intervals by using a wireless network.

(5) In the storage battery management system 1 of the embodiment described above, a plurality of mobile terminals 10 may manage the storage battery information of one storage battery unit 20 by acquiring and holding the storage battery information. When an inquiry about the storage battery information of the one storage battery unit 20 is made, the management server 30 may acquire the information about which the inquiry was made from a mobile terminal 10 of the plurality of mobile terminals 10, the mobile terminal 10 holding the latest storage battery information. Moreover, if the storage battery information about which the inquiry was made cannot be acquired from a certain mobile terminal 10 because, for example, the mobile terminal 10 is turned off, the management server 30 may acquire the storage battery information from another mobile terminal 10. This method is useful when a plurality of users manage one storage battery unit 20.

(6) The above description deals with a case in which, in the storage battery management system 1 of the embodiment described above, the management server 30 manages the update state of the storage battery information in the mobile terminal 10 (FIG. 6). The embodiment described above is not limited to this case; in place of the management server 30, the mobile terminal 10 may manage the update of the storage battery information.

Specifically, as is the case with the managing portion 32 of the management server 30, the mobile terminal 10 performs monitoring to determine whether or not a period in which the storage battery information has not been updated is longer than a predetermined period based on the update date and time information of the storage battery information stored in the storage battery management database 12. If the period in which the storage battery information has not been updated is longer than the predetermined period, the mobile terminal 10 may perform a screen display urging update of the storage battery information or provide a notification to the effect that the storage battery information has not been updated for a long period of time.

Incidentally, the mobile terminal 10 may perform communication with the storage battery unit 20 without wire and automatically update the storage battery information if the period in which the storage battery information has not been updated is longer than the predetermined period.

As described above, when the mobile terminal 10 manages the update of the storage battery information in place of the management server 30, the mobile terminal 10 does not have to provide the date and time information to the management server 30 every time the mobile terminal 10 acquires the storage battery information from the storage battery unit 20. However, in that case, it is desirable that the mobile terminal 10 regularly provides, to the management server 30, a notification indicating whether or not the storage battery information is normally updated to make it possible to grasp the update state of the storage battery information in the mobile terminal 10 on the management server 30.

(7) The mobile terminal 10 of the embodiment described above simply has to have the communication function of performing communication with the storage battery unit 20 and the management server 30 and may be a stationary communication terminal.

(8) Each of the component elements of the mobile terminal 10, the storage battery unit 20, and the management server 30 described in the embodiment described above, the modified examples, and so forth may be implemented as large scale integration (LSI) which is an integrated circuit. In so doing, the component elements may be individually implemented as one chip or may be implemented as one chip in such a way as to include part or all of the component elements. Moreover, the name "LSI" is used here, but, depending on the difference in the degree of integration, it is sometimes called an integrated circuit (IC), system LSI, super LSI, or ultra LSI. Furthermore, the technique of circuit integration is not limited to LSI, and circuit integration may be implemented by a dedicated circuit or a general-purpose processor. A field programmable gate array (FPGA) or a reconfigurable processor that allows the connection and settings of circuit cells in LSI to be reconfigured may be used. In addition, if the circuit integration technology replacing LSI appears by the development of the semiconductor technology or the advent of another derivative technology, it goes without saying that the functional blocks may be integrated by using that technology.

(9) At least part of the procedure of the operation of the mobile terminal 10, the storage battery unit 20, and the management server 30, the operation described in the embodiment described above, the modified examples, and so forth may be described in a program and, for example, a central processing unit (CPU) may read and execute the program stored in memory or the program may be stored in a recording medium and distributed, for example.

(10) The contents described in the embodiment, the modified examples, and so forth may be appropriately combined.

<7. Supplementary Explanation (II)>

The following is a short description of the communication terminal, the storage battery management method, and the storage battery management system according to the embodiment described above, the modified examples, and the supplementary explanation (I).

(1) A first aspect of the present disclosure provides a storage battery management method, which is performed in a communication terminal, includes performing communication with a storage battery which is an object to be managed and acquiring storage battery information on a use of the storage battery; storing the acquired storage battery information every time the storage battery information is acquired, and performing communication with a management server managing the storage battery and providing, only when accepting a request for provision of the storage battery information from the management server, storage battery information of the stored storage battery information, the storage battery information in accordance with the request for provision, to the management server.

With the first aspect described above, the management server can acquire desired storage battery information from the mobile terminal if there is desired storage battery information without storing the storage battery information at all times, which makes it possible to reduce a communication load between the communication terminals in the management server.

(2) A second aspect of the present disclosure provides, in the first aspect described above, the storage battery management method may further provide, to the management server, date and time information on a date and a time on and at which the storage battery information has been acquired.

With the second aspect described above, the management server can manage the update state of the storage battery information in the communication terminal.

(3) A third aspect of the present disclosure provides, in the second aspect described above, the storage battery management method may further perform a screen display urging a communication terminal user to update the storage battery information when the update request to update the storage battery information from the management server is accepted.

With the third aspect described above, it is possible to urge the communication terminal user to update the storage battery information if the management server makes an update request to update the storage battery information.

(4) A fourth aspect of the present disclosure provides, in the first or second aspect described above, the storage battery management method which may be further perform a screen display urging a communication terminal user to update the storage battery information when the storage battery information stored in the memory has not been updated for a longer period of time than a predetermined period.

With the fourth aspect described above, it is possible to urge the communication terminal user to acquire the storage battery information if the storage battery information stored in the memory has not been updated for a long period of time.

(5) A fifth aspect of the present disclosure provides a non-transitory tangible medium storing a storage battery management program which is performed in a communication terminal performing communication with a storage battery which is an object to be managed and a management server, in which the storage battery management program makes the communication terminal acquire storage battery information on the use of the storage battery, store the acquired storage battery information every time the storage battery information is acquired, and, only when accepting a request for provision of the storage battery information from the management server, provide storage battery information of the stored storage battery information, the storage battery information in accordance with the request for provision, to the management server.

With the fifth aspect described above, the management server can acquire desired storage battery information from the mobile terminal if there is desired storage battery information without storing the storage battery information at all times, which makes it possible to reduce a communication load between the communication terminals in the management server.

(6) A sixth aspect of the present disclosure provides a storage battery management system that manages storage battery information includes a first communicator that performs communication with a storage battery which is an object to be managed and acquires storage battery information on a use of the storage battery, a storing portion that stores the acquired storage battery information every time the storage battery information is acquired in the first communicator, a second communicator that performs communication with a management server managing the storage battery and, only when accepting a request for provision of the storage battery information from the management server, provides storage battery information of the storage battery information stored in the storing portion, the storage battery information in accordance with the request for provision, to the management server, and a third communicator that receives an inquiry about the storage battery information and sends the request for provision of storage battery information in accordance with the inquiry to the second communicator from the management server.

With the sixth aspect described above, the communication terminal and the management server can manage the storage battery information in cooperation with each other. Specifically, the communication terminal holds the storage battery information and the management server can acquire desired storage battery information from the mobile terminal if there is desired storage battery information without storing the storage battery information at all times, which makes it possible to reduce a communication load between the communication terminals in the management server.

(7) An seventh aspect of the present disclosure provides, in the sixth aspect described above, the storage battery management system further including a memory that stores date and time information on a date and a time ,on and at which the storage battery information has been acquired, sent from the second communicator to the third communicator, and a display that performs a screen display urging a communication terminal user to update the storage battery information when an update request, based on the stored date and time information, to update the storage battery information is sent from the third communicator to the second communicator.

With the seventh aspect described above, it is possible to urge the communication terminal user to acquire the storage battery information when the storage battery information stored in the communication terminal has not been updated for a long period of time.

(8) A eighth aspect of the present disclosure provides, in the sixth or seventh aspect described above, the storage battery management system further comprise a manager determines whether or not to provide storage battery information in accordance with an inquiry depending on a user who has made the inquiry, and causes the third communicator to send a request to provide storage battery information in accordance with the inquiry to the second communicator in determining to provide storage battery information in accordance with the inquiry.

With the eighth aspect described above, it is possible to determine, for each inquiry user, whether or not to provide storage battery information about which an inquiry has been made.

The present disclosure is useful when service is provided to the user by managing information on the use of a storage battery.

What is claimed is:

1. A storage battery management method which is performed by a communication terminal, the storage battery management method comprising:
    performing communication with a first storage battery, which is an object to be managed, and acquiring, from the first storage battery, storage battery information on a use of the first storage battery;
    storing, by the communication terminal, in a memory provided in the communication terminal, the acquired storage battery information when the storage battery information is acquired from the first storage battery;
    receiving, by the communication terminal, a first request from a management server that manages the first storage battery, the first request requesting the communication terminal to transmit first storage battery information to the management server, the first storage battery information being the storage battery information of the first storage battery; and
    performing communication with the management server and transmitting, when the communication terminal receives the first request from the management server, the first storage battery information to the management server, based on the storage battery information stored in the memory, the first storage battery information being transmitted to the management server in accordance with the first request.

2. The storage battery management method according to claim 1, further comprising:
    transmitting, to the management server, date and time information on a date and a time on and at which the storage battery information on the use of the first storage battery has been acquired from the first storage battery.

3. The storage battery management method according to claim 1, further comprising:
    receiving, from the management server, an update request to update the storage battery information stored in the memory;

displaying a screen display urging a communication terminal user to update the storage battery information stored in the memory, when the update request is received from the management server.

4. The storage battery management method according to claim 1, further comprising:
displaying a screen display urging a communication terminal user to update the storage battery information stored in the memory, when the storage battery information stored in the memory has not been updated for a longer period of time than a predetermined period.

5. A communication terminal that manages storage battery information on a use of a storage battery, the communication terminal comprising:
a first communicator that performs communication with a first storage battery, which is an object to be managed, and acquires, from the first storage battery, storage battery information on a use of the first storage battery;
a memory that stores the acquired storage battery information when the storage battery information is acquired from the first storage battery by the first communicator; and
a second communicator that receives, from a management server that manages the first storage battery, a first request requesting the communication terminal to transmit first storage battery information to the management server, the first storage battery information being the storage battery information of the first storage battery;
wherein the second communicator performs communication with the management server, and, when the second communicator receives the first request from the management server, transmits the first storage battery information based on the storage battery information stored in the memory, the first storage battery information being transmitted to the management server in accordance with the first request.

6. The communication terminal according to claim 5, wherein
the second communicator further transmits, to the management server, date and time information on a date and a time on and at which the storage battery information on the use of the first storage battery has been acquired from the first storage battery by the first communicator;
the second communicator further receives, from the management server, an update request to update the storage battery information stored in the memory, and
the communication terminal further comprises a display that displays a screen display urging a user of the communication terminal to update the storage battery information stored in the memory, when the update request to update the storage battery information is received by the second communicator from the management server.

7. The storage battery management method according to claim 2, wherein
when the storage battery information is acquired from the first storage battery and is stored into the memory, the date and time information is transmitted to the management server, and the storage battery information acquired from the first storage battery is not transmitted to the management server.

8. The storage battery management method according to claim 1, wherein the storage battery information stored in the memory includes at least one of a charging time, a number of times the first storage battery is charged, a discharging time, a number of times the first storage battery is discharged, or information on a load on which discharge is to be performed.

9. The storage battery management method according to claim 1, wherein
when the communication terminal receives the first request, the first storage battery information is transmitted to the management server based on the storage battery information stored in the memory regardless of connection between the communication terminal and the first storage battery.

10. The storage battery management method according to claim 3, wherein
in response to displaying the screen display urging a communication terminal user to update the storage battery information stored in the memory, the communication terminal is connected to the first storage battery by a connecting cable, to acquire the storage battery information from the first storage battery.

* * * * *